Figure 1:
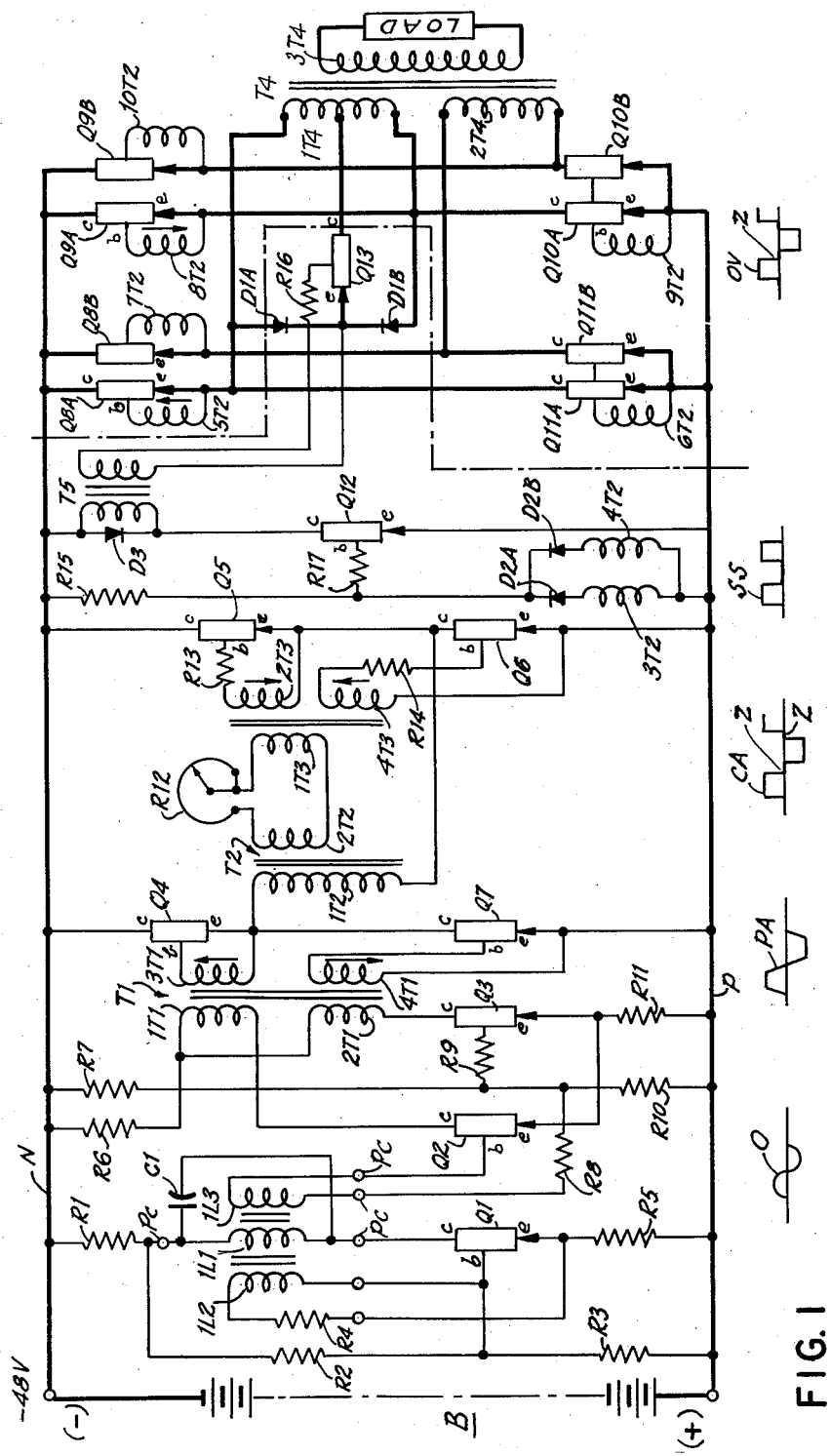

3,041,551
ELECTRIC CURRENT INVERTER
Warren J. Dornhoefer, deceased, late of Littleton, Mass., by Edna M. Dornhoefer, administratrix, Littleton, Mass., assignor to Warren Manufacturing Company Inc., Littleton, Mass., a corporation of Massachusetts
Continuation of application Ser. No. 815,865, May 26, 1959. This application Oct. 27, 1961, Ser. No. 152,705
18 Claims. (Cl. 331—75)

This is a continuation of the application of Warren J. Dornhoefer, deceased, Serial No. 815,865, filed May 26, 1959, now abandoned.

This invention relates generally to electric current inverters of the static type for translating constant direct current into alternating current of a given frequency exclusively by means of transistors or other solid-state components.

The inverters predominantly in use for such purposes have a substantially sinusoidal output voltage. Those of the dynamo-electric and electronic-tube multi-vibrator types are virtually limited in practice to operation from a commercial power line and often require a stand-by power supply to operate in the event of commercial power failure. In many cases, the inverter equipment is inconveniently large and requires a considerable amount of maintenance particularly in communication-line exchanges where a number of inverters are installed to provide for alternating currents of respectively different frequencies.

It is a broad object of the invention to provide an inverter for such purposes as mentioned above, that is composed exclusively of static and hence mechanically insensitive components requiring a minimum of maintenance, and that combines small size and small weight with high efficiency. This object can be attained, in principle, by providing the static-type inverter with a transistor oscillator for controlling the operation of an amplifying stage or cascade of switching transistors so as to translate the unidirectional input voltage of the inverter into a square-wave output voltage of the desired frequency as determined by that of the oscillator. Such provision of amplifying transistors operating in the switching mode affords a considerable simplification and increased reliability as well as reduced size of the over-all inverter equpiment, and the resulting square-wave output, in principle, should afford a better load-circuit performance because, for a given value of peak voltage, a square wave furnishes more power to the receiving load than a sine wave, thus providing for better insulation protection and safety.

However, associated with the square-wave output of a switching-transistor inverter are certain detriments apt to overshadow the desired advantages. Among these detriments is the fact that the square wave shape is not always compatible with existing load equipment designed for operation with sine-wave voltage. For example, consider a typical piece of electronic equipment having a power-transformer supplying filament heater voltage and plate supply voltage through a rectifier and capacitor input filters. The heating value of the voltage is the root-mean-square value (R.M.S. voltage), while the plate supply voltage is near the peak value of voltage. The crest factor, i.e. the ratio of peak to R.M.S. voltage, in a sine wave is equal to 1.41, whereas in a square wave it is 1.0.

Another shortcoming of voltage inversion by switching transistors is the fact that, normally, a square wave thus produced possesses a much greater share in upper harmonics, particularly the third harmonic, than a sine wave so that, in cases where several inverters of graduated respective frequencies are to be used for selective operation of tuned receivers, the desired selectivity is impaired or lost. This will be realized if one considers that a square-wave voltage of 100 volts, for example, contains as much as about 30 volts of the third harmonic.

It is, therefore, a more specific object of the invention to minimize or virtually obviate the above-mentioned disadvantages and to provide a static-type switching inverter which, without foregoing the advantages of the switching mode, is capable of furnishing an output voltage from which the third harmonic is eliminated or which otherwise simulates those characteristics of a sine wave that are critical or desirable for the intended use.

Another object of the invention is to improve the reliability of the switching transistors and to protect them by simple and entirely static solid-state components from damage due to reactive loads applied to the alternating-current output terminals of the inverter.

According to the invention, for achieving the above-mentioned modification of the square wave in simulation of a sine-wave output, the substantially sinusoidal signal produced by the transistor oscillator stage of the inverter is applied, preferably after pre-amplification in an amplitude-limiting transistor amplifier, to the power-amplifier switching transistors through an intermediate coupling network which is designed as a chopper and comprises a suppressor circuit consisting of a combination of resistive and reactive impedance means that cooperate to blank out a time portion of the square wave in the vicinity of its zero passages. Preferably the suppressor circuit comprises a magnetically saturable reactor, such as a saturable transformer or saturable reactor coil, which is subject to the sinusoidal or still partly sinusoidal wave of the oscillator or pre-amplifier signal and becomes abruptly saturated when the signal voltage-time product passes through a given instantaneous value. Thus, the saturable reactor component of the suppressor circuit operates to modify the square wave output voltage of the switching-transistor amplifier by inserting between each positive and negative half-waves a zero step of the length required for the desired wave modification.

According to another feature of the invention, the signal or modified signal wave, taken from ahead of the switching-mode power amplifier, is used to periodically trigger a switching transistor in an auxiliary network, hereinafter called "shorting circuit," which is connected to the output transformer of the power amplifier for periodically short-circuiting that transformer during the "off" periods of the power transistors of the amplifier. As a result, the power transistors are protected from being subjected to excessive voltage due to reactive energy storage in the load.

Figure 2:
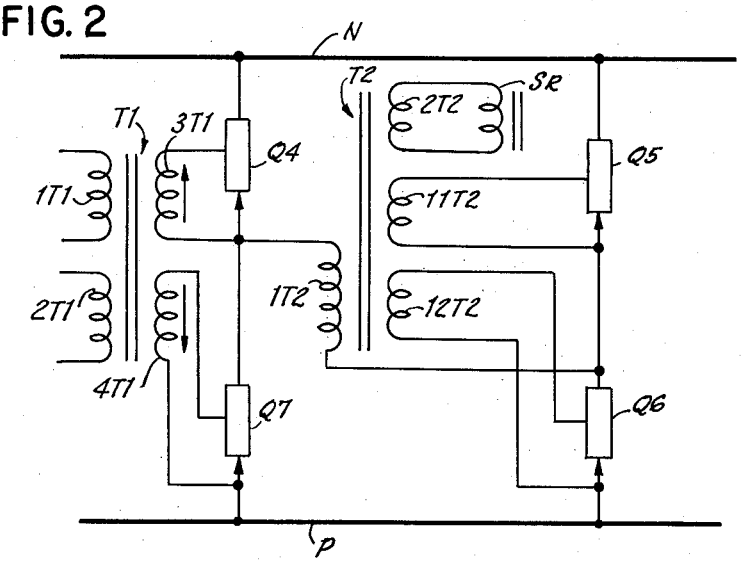
Figure 3:
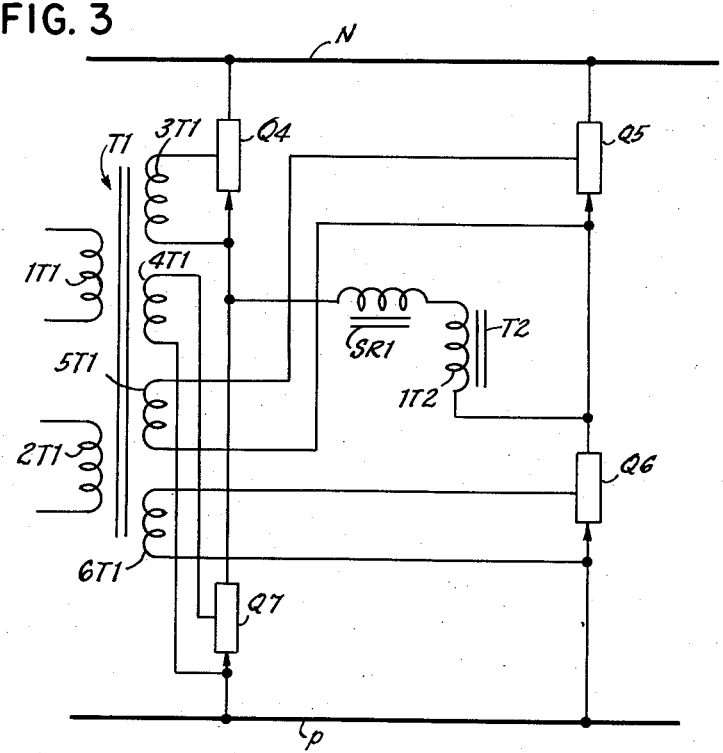

The foregoing and more specific objects, advantages and features of the invention will be apparent from, or will be mentioned in, the following description of the embodiments shown, by way of example, on the accompanying drawings in which FIG. 1 is a schematic circuit diagram of a D.-C. to A.-C. inverter, and FIGS. 2 and 3 show the circuit diagrams of modifications applicable in an inverter otherwise similar to that of FIG. 1.

In the following description, correlated numerical values of electric parameters are given in parentheses; but it should be understood that these values are presented only by way of example and may be modified, in proper correlation to one another, depending upon the requirements or preferences of any particular application. All transistors of the illustrated inverter consist preferably of junction-type transistors, such as p-n-p germanium transistors. The collector electrode of some transistors is denoted by $c$, the emitter electrode by $e$, and the base electrode by $b$.

The direct voltage to be inverted is supplied from a source B of constant current (48 volts), such as a central-office battery in an exchange, through a negative bus N and a positive bus P. The voltage is impressed across a voltage divider formed by three resistors R1 (3900 ohms), R2 (2700 ohms), and R3 (2700 ohms), connected in series between buses N and P. The base $b$ of a transistor Q1 is connected to a circuit point between resistors R2 and R3. The emitter $e$ of transistor Q1 is connected to bus P through a resistor R5 (4700 ohms). The collector circuit of transistor Q1, extending from collector $c$ to a circuit point between resistors R1 and R2, includes a tank circuit composed of a capacitor C1 (3.3 mfd.), and an inductance coil 1L1 (2 henrys; the tank circuit parameters are given for 60 c.p.s.). The core of inductance coil 1L1 has a substantially linear characteristic and may be made of powdered permalloy. The core carries two secondary windings 1L2 and 1L3. Winding 1L2 is feed-back-connected between the base $b$ and emitter $e$ of transistor Q1 through a resistor R4 (470 ohms for 60 c.p.s.). The oscillator output wave, shown schematically at O, is sinusoidal. It is supplied by winding 1L3 to the input terminals of a preamplifier network described below.

If desired, the tank circuit components C1, 1L1, 1L2, 1L3 and resistor R4 may be combined to a unit which is shielded by its own metal can, and may be connected with the other components of the inverter by a multiple plug connection whose individual plug-and-socket pairs are indicated by respective circles such as those denoted by PC. Thus, the frequency of the inverted output voltage can be changed simply by exchanging the oscillator unit for one of different tuning.

The illustrated pre-amplifier is essentially a constant sum-current amplifier of the differential type. The input signal from winding 1L3 is applied to the base $b$ of a transistor Q2 and also, through a resistor R8 (1000 ohms), to the mid-point of a voltage divider formed by two resistors R7 (10,000 ohms) and R10 (10,000 ohms) extending in series between buses N and P. Another transistor Q3 has its base connected to the same mid-point through a resistor R9 (1000 ohms). The respective emitters $e$ of transistors Q2 and Q3 are jointly connected through a resistor R11 (1000 ohms) to bus P.

The collector circuits of transistors Q2 and Q3 include respective primary windings 1T1 and 2T1 of a coupling transformer T1 in series with a resistor R6 (470 ohms). The output of the pre-amplifier appears at the secondary windings 3T1 and 4T1 of transformer T1. The signal provided by the secondary 1L3 of inductance coil 1L1 is sufficient to cause saturation of the pre-amplifier transistors Q2 and Q3. Therefore, the voltage of the secondary windings 3T1 and 4T1 of the driver output transformer T1, shown schematically at PA, has a limited amplitude and hence has substantially sinusoidal flanks but a flattened top.

The two secondary windings 3T1, 4T1 apply the pre-amplifier output signal to the next stage of the system, hereinafter briefly called chopper amplifier, which comprises four bridge-connected transistors Q4, Q5, Q6, Q7, and furnishes an output signal representing a square wave modified in accordance with a desired characteristic, namely in such a manner as to suppress the third harmonic or to duplicate the crest-factor of a sine wave, or to obtain whatever ratio of RMS to peak value may be required, as will be more fully explained in a later place. The secondary windings 3T1 and 4T1 of transformer T1 are connected in the respective base-emitter circuits of transistors Q4, Q7, and are so poled that when the base of one of transistors Q4, Q7 has a positive potential relative to its emitter, the base of the other transistor has a negative potential, and vice versa. Hence, the two transistors are alternately turned "on" and "off," only one of them being "on" at a time.

The primary winding 1T2 of a coupling transformer T2 is connected in the bridge-diagonal branch extending from a circuit point between transistors Q4 and Q7 to a corresponding point between transistors Q5 and Q6. The coupling transformer T2 has a total of nine secondary windings designated by 2T2 through 10T2. Only one of these windings, namely secondary 2T2, is shown directly adjacent to the primary winding 1T2, whereas the others are shown at various other places for the purpose of lucid, straight-line illustration.

The secondary 2T2 of coupling transformer T2 forms part of a suppressor circuit which comprises an adjustable rheostat R12 (100 ohms, 2 w.) in series with the primary winding 1T3 of a transformer T3 with two secondary windings 2T3 and 4T3. The secondary 2T3 is connected in the base-emitter circuit of transistor Q5 in series with a resistor R13 (15 ohms). The secondary 4T3 is similarly connected through a resistor R14 (15 ohms) between base and emitter of transistor Q6.

It will be understood that the chopper amplifier stage just described receives its driving signal from the transformer T1, this signal being impressed by the secondaries 3T1 and 4T1 upon the switching transistors Q4 and Q7. The coupling transformer T2 represents the output thansformer of the chopper amplifier and, in addition to those of its secondaries (3T2 through 10T2) that drive the next following stages of the inverter system, possesses a feedback winding, namely the secondary 2T2, which provides the voltage for driving the switching transistors Q5 and Q6 through the medium of the suppressor circuit. As described, the feedback winding 2T2 is coupled with the driving circuits of switching transistors Q5 and Q6 through the adjustable rheostat R12 and the transformer T3. The transformer T3 and the rheostat R12 provide for an adjustable "off" to "on" time relationship which is essential for the desired suppression of the third harmonic or other modification of the ultimate square-wave output voltage of the inverter system.

To achieve the desired purpose, the core material of transformer T3 has an extremely sharp saturation characteristic as well as high retentivity, such material being commercially available under the trademarks Deltamax or Orthonol. The volt/second capacity of the primary winding 1T3 is such that it will absorb only one-half of the voltage appearing at the winding 2T2 of transformer T2. Once transformer T3 has saturated, no further energy can be transferred from the output transformer T2 to the emitter-base circuit of transistors Q5, Q6. When these transistors are deprived of a signal voltage, they revert to a state similar to the "off" condition. This, in effect, corresponds to the insertion of a very high resistance in series with the primary 1T3 of transformer T3 for whatever period of time is required by the application. Rheostat R12 reduces, by its IR drop, the voltage across winding 1T3 during energy transfer. The setting of rheostat R12 therefore permits the "off" to "on" time ratio to be varied from one-half cycle period to zero. By designing the transformer T3 for lower saturation voltages, any other desired ratio may be obtained.

The output of transformer T2, appearing in the secondary windings 3T2 to 10T2, has a chopped square wave shape which may be varied to suit the particular requirements mentioned above, namely preferably to suppress the third or fifth harmonic, or to modify the square wave shape in simulation of a sine wave. The chopped wave, shown schematically at CA, is characterized by zero steps Z between each successive positive and negative half-wave. The time length of the steps Z is such as to obtain the desired increase in crest factor or the desired suppression of upper harmonics.

The chopper output transformer T2 supplies the modified square-wave signal CA to a power amplifier stage which is essentially a switching-transistor device and, in the illustrated embodiment, comprises a total of eight transistors Q8A, Q8B, Q9A, Q9B, Q10A, Q10B, Q11A and Q11B. Transistors Q8A and Q11A are connected in series with each other between the buses N and P. Transistors Q9A and Q10A are similarly connected between the buses. The transistors Q8B and Q11B form together a parallel circuit relative to transistors Q8A and Q11A; and transistors Q9B and Q10B are similarly connected in parallel with transistors Q9A and Q10A. Each of these transistors receives a control signal from transformer T2 through one of the respective secondaries 5T2 through 10T2. Thus, each of the transistors Q8A through Q11B is driven by the above-mentioned output signal CA of the chopper amplifier.

The power output transformer T4 of the inverter system has two primaries 1T4 and 2T4 poled in the same sense. The primary 1T4 is connected to the lead extending between the emitter of transistor Q8A and the collector of transistor Q11A on the one hand, and to the lead between the emitter of transistor Q9A and the collector of transistor Q10A on the other hand. The primary winding 2T4 is similarly connected between a circuit point intermediate the transistors Q8B and Q11B on the one hand and a corresponding circuit point intermediate the transistors Q9B and Q10B on the other hand. The secondary winding 3T4 of the power output transformer T4 energizes the inverter load circuit.

The operation of the switching amplifier stage will be more readily understood if one first disregards the presence of the parallel transistors Q8B, Q11B, Q9B, Q10B and of the primary winding 2T4 to which these transistors are connected.

The transistors Q8A, Q9A, Q10A, Q11A are driven by the voltages of the respective secondary windings of transformer T2 so as to duplicate the input signal coming from the chopper amplifier. During a positive going pulse, the transistors Q8A and Q10A are turned "on," while transistors Q9A and Q11B are simultaneously turned "off." During the "off" or zero interval of the chopper output signal, all four transformers are deprived of any drive. During the negative going pulse, transistors Q9A and Q11A are turned "on," while transistors Q8A and Q10A are turned "off." As a result, the chopper output signal, having the modified shape explained above is duplicated and amplified in the transformer winding 1T4, thus being transmitted to the load circuit.

The parallel connected transistors Q8B, Q9B, Q10B and Q11B operate in the same manner as the group of respective transistors Q8A through Q11A, except that they energize the second primary winding 2T4 of transformer T4 which operates in the cumulative sense relative to the winding 1T4.

It will be understood that for the purposes of the present invention only a single power amplifier, such as the bridge network of transistors Q8A, Q11A, Q9A and Q10A, is required. The more elaborate transistor and transformer system used in the embodiment shown on the drawing and described above, is in accordance with the invention of John Contino, disclosed and claimed in the copending application Serial No. 814,739, filed May 21, 1959. The provision of parallel transistors is suitable in cases where the output power requirements of the inverter system are relatively great. The proper load sharing of the paralleled transistors is secured by splitting the primary winding of the power output transformer T4 into as many mutually insulated paths as there are paralleled groups of transistors. That is, if desired, more than one parallel path with respect to each pair of transistors may be provided, giving the output transformer T4 just as many primary windings as there are transistor parallel circuits. The respective primary windings are given equal winding resistances. With the transistors approaching ideal switching operation, any difference in the respective shares of the load current passing through the parallel transistor paths would tend to cause a greater IR drop in one of the primary windings relative to the other, but due to the mutual inductive coupling of the primary windings the system inherently counteracts such tendency with the result of imposing equal shares of load upon the paralleled transistors. Ideal conditions in this respect are obtained when the winding resistances of the transformer primaries are greater than the saturation resistance of the transistors.

The above-described operation of the power amplifying transistor stage is subject to the effect of a device, hereafter called "shorting circuit," which protects the power transistors from excessive voltage surges and also improves the fidelity of the amplified output signal.

The shorting circuit is energized through the secondaries 3T2, 4T2 of the chopper output transformer T2 and comprises two diodes D2A, D2B consisting, for instance, of silicon or other solid-state rectifier elements. The secondary windings 3T2, 4T2 and diodes D2A, D2B form together with a resistor R15 (200 ohms) a voltage divider which has a tap point connected through a resistor R17 (15 ohms) with the base of a transistor Q12. This transistor is connected between the buses N and P in series with a diode D3 also of the solid-state type. A transformer T5 has its primary connected across the diode D3. The secondary of transformer T5 is connected between the base and the emitter of a transistor Q13 through resistor R16. The collector of transistor Q13 is connected to a mid-tap of the transformer winding 1T4. A solid-state diode D1A connects the emitter of transistor Q13 with the circuit mid-point between transistors Q8A and Q11A. Another solid-state diode D1B connects the emitter of transistor Q13 with the circuit mid-point between transistors Q9A and Q10A.

The performance of the shorting circuit will be understood when one considers the condition of reactive and hence energy-storing loads. Energy stored during the "on" time will attempt to dissipate itself during the "off" time, namely during the zero-step interval Z of the chopped wave represented at OV. In the case of purely reactive loads, the only path normally available for dissipation would be through the power output transformer T4 which reflects a very high resistance. Such dissipation would result in high voltages induced in the primary winding or windings of transformer T4 which, in turn, may cause puncture of the power transistors Q8A to Q11B. However, such defects are avoided by the shorting circuit which places a short-circuit connection across the primary 1T4 of transformer T4 during the "off" intervals and thereby limits the induced voltages. Under ideal conditions, the limited "off" time voltage would be zero. In reality, the short circuit comprises the forward resistance of one of the diodes D1A, D1B plus the forward resistance of the transistor Q13.

The just-mentioned short-circuiting connection comes about as follows. In the absence of any signal in the windings 3T2, 4T2, the transistor Q12 is turned on by the current through the resistor R15. The transistor Q12 thus energizes the primary winding of transformer T5 whose secondary winding turns on the transistor Q13. The power output transformer T4 is thus shorted through transistor Q13 and one of the diodes D1A, D1B depending upon the polarity of the stored energy. Transistor Q12 is turned off by either a positive or negative pulse of output voltage from transformer T2, by virtue of the center-tapped rectifier bridge comprising the windings 3T2, 4T2 and the diodes D2A, D2B. Rectifier diode D3 serves to keep induced voltages of transformer T5 shorted when transistor Q12 is opened rapidly.

It will be obvious to those skilled in the art, upon studying this disclosure, that inverters according to the invention can be modified in various respects, particularly with reference to the individual stages or component networks that cooperate in the above-described manner to produce the desired modified square-wave output voltage. To illustrate such possibilities, two different modifications of chopper networks will now be described with reference to FIGS. 2 and 3. Each of these two networks can be substituted for the network comprising the transistors Q4 to Q7 in FIG. 1 without necessarily changing the rest of the circuitry.

In the embodiment of FIG. 2 the two transistors Q4 and Q7 of the transistor bridge network are directly driven from transformer T1 in the same manner as explained above with reference to FIG. 1. The two other transistors Q5 and Q6 are driven directly by voltages supplied from respective feedback windings 11T2 and 12T2 of the chopper output transformer 1T2, thus eliminating the suppressor circuit R12–T3 shown in FIG. 1. In lieu thereof the transformer T2 has a secondary winding 2T2 connected across a saturable reactor SR whose core consists of square-loop magnetic material to secure abrupt saturation when the voltage-time product of winding 2T2 exceeds a given value.

During the nonsaturated period of reactor SR the voltage appearing across winding 1T2 is transformed to the base-emitter circuits of transistors Q5 and Q6 through windings 11T2 and 12T2. When reactor SR saturates, no further voltage appears on windings 11T2 and 12T2 by virtue of reactor SR reflecting a short circuit on transformer T2. Therefore transistors Q5 and Q6 are deprived of driving voltage for the period of time during which reactor SR is saturated.

In the embodiment of FIG. 3 the four transistors Q4 to Q7 are individually driven by voltages from the secondary windings 3T1, 4T1, 5T1 and 6T1 of the input transformer T1. A saturable reactor SR1 is connected in series with the primary of transformer T2 which in this case has only the secondary windings denoted by T2 through 10T2 in FIG. 1. The saturable reactor SR1, whose core has square-loop characteristic, offers high impedance at low instantaneous voltage values and thus absorbs the first portion of the voltage cycle. Consequently, the primary 1T2 of transformer T2 receives appreciable voltage only after the saturation moment of the reactor.

Such and other modifications, not altering the basic performance desired and not departing from the essential features of the invention, are intended to be within the scope of the claims annexed hereto.

What is claimed is:

1. A static inverter for translating direct current into alternating current of a given frequency, comprising a transistor oscillator having an oscillatory voltage of said frequency, two direct-current supply buses of substantially constant voltage, a bridge network having a first pair and a second pair of switching transistors, the two transistors of each pair having respective emitter-collector circuits connected in series with each other across said buses with all four transistors poled in the same sense relative to said buses, a transformer having a primary winding connected between two points of said network intermediate the two transistors of said respective two pairs, each of said four switching transistors having a base and having a control circuit extending from said base to the emitter of said transistor, circuit means connecting the two control circuits of said first pair with said oscillator, said two control circuits of said first pair having mutually opposed poling relative to said oscillator voltage for alternately turning the two transistors of said first pair on and off in inverse relation to each other, said transformer having secondary winding means and a secondary feedback winding, a suppressor circuit comprising saturable reactive impedance means and being connected to said feeback winding to be energized therefrom, the two control circuits of said second transistor pair being coupled through said suppressor circuit and said saturable reactive impedance means with said feedback winding to receive respective control voltages from said suppressor circuit, said latter two control circuits being poled in phase-opposition to each other in the sense required to render each of said second-pair transistors conductive during the conductive period of the one first-pair transistor that, at a time, completes a current path through said primary winding between said two buses, whereby said primary winding is supplied from said buses with alternating voltage of square wave shape which, due to the saturating action of said suppressor circuit, is stepped near its zero passages to suppress upper harmonics, and a static power amplifier of the switching type having input circuit means connected to said secondary winding means to be controlled thereby and having an output circuit to provide amplified output voltage of stepped square wave shape.

2. In a static inverter according to claim 1, said saturable reactive impedance means in said suppressor circuit comprising a magnetically saturable inductance member and an ohmic resistance member both forming a coupling between said feedback winding and said two control circuits of said other transistors.

3. In a static inverter according to claim 1, said saturable reactive impedance means in said suppressor circuit comprising a magnetically saturable transformer of substantially rectangular magnetic characteristic having a primary winding connected with said feedback winding to be energized therefrom, and an ohmic resistance member connected between said feedback winding and said primary winding, said saturable transformer having secondary windings connected with said respective two control circuits of said second pair of transistors.

4. A static inverter for translating direct current into alternating current of a given frequency, comprising a transistor oscillator having an oscillatory voltage of said frequency, two direct-current supply buses, a bridge network having two pairs of switching transistors, the two transistors of each pair having respective emitter-collector circuits connected in series with each other across said buses with all four transistors poled in the same sense, a transformer having a primary winding connected between two points of said network intermediate the transistors of said respective pairs, each of said transistors having a base-to-emitter control circuit, circuit means connecting the two control circuits of one of said pairs in mutually phase-opposed voltage relation with said oscillator for alternately turning the two transistors of said pair on and off in inverse relation to each other, said transformer having secondary winding means and a secondary feedback winding, a loop circuit comprising said feedback winding to be energized therefrom and having saturable reactive impedance means and ohmic resistance means connected with each other, said loop circuit being coupled with said two control circuits of said other pair of transistors, said latter control circuits being poled in mutually opposed phase relation and in the sense required to complete and alternately reverse a current path through said primary winding between said two buses, whereby said primary winding is supplied from said buses with alternating voltage of a square wave shape which, due to the saturating action of said loop circuit, is stepped near its zero passages to suppress upper harmonics, a load circuit, and circuit means connecting said load circuit with said secondary winding means for supplying stepped square-wave voltage to said load circuit.

5. In a static inverter according to claim 4, said ohmic resistance means comprising an adjustable rheostat for varying the off-to-on time ratio of said stepped square-wave voltage.

6. A static inverter for translating direct current into alternating current of a given frequency, comprising a transistor oscillator having an oscillatory voltage of said frequency, two direct-current supply buses, a bridge network having two pairs of switching transistors, the two transistors of each pair having respective emitter-collector circuits connected in series with each other across said buses with all four transistors poled in the same sense, a transformer having a primary winding connected between two points of said network intermediate the transistors of said respective pairs, each of said transistors having a base-to-emitter control circuit, circuit means connecting the two control circuits of one of said pairs in mutually opposed phase relation with said oscillator for alternately turning the two transistors of said pair on and off in inverse relation to each other, said transformer having secondary winding means and a secondary feedback winding, a loop circuit comprising said feedback winding to be energized therefrom and having an adjustable resistor and a saturable transformer connected in series with each other, said saturable transformer having two secondary windings connected with said respective two control circuits of said other transistors, said latter two control circuits being poled in the sense required to complete and alternately reverse a current path through said primary winding between said two buses, whereby said secondary winding means provide a square wave voltage modified by saturating action of said loop circuit to have a crest factor simulating that of a sine wave and adjustable by means of said resistor.

7. A static inverter for translating direct current into alternating current of a given frequency, comprising two direct-current supply buses, a transistor oscillator connected to said supply buses to be energized therefrom and having a tank circuit tuned to said frequency and having a substantially sinusoidal signal voltage, a transistor pre-amplifier coupled with said tank circuit to receive said signal voltage and having amplitude-limiting means to provide a flat-top voltage, said pre-amplifier being connected to said buses to be energized therefrom, a bridge network having two pairs of switching transistors, the two transistors of each pair having respective emitter-collector circuits connected in series with each other across said buses with all four transistors poled in the same sense, a transformer having a primary winding connected between two points of said network intermediate the transistors of said respective pairs, each of said transistors having a base-to-emitter control circuit, circuit means connecting the two control circuits of one of said pairs in mutually phase-opposed voltage relation with said oscillator for alternately turning the two transistors of said pair on and off in inverse relation to each other, said transformer having secondary winding means and a secondary feedback winding, a loop circuit comprising said feedback winding to be energized therefrom and having saturable reactive impedance means and ohmic resistance means connected with each other, said loop circuit being coupled with said two control circuits of said other pair of transistors, said latter control circuits being poled in mutually opposed phase relation and in the sense required to complete and alternately reverse a current path through said primary winding between said two buses, whereby said primary winding is supplied from said buses with alternating voltage of a square wave shape which, due to the saturating action of said loop circuit, is stepped near its zero passages to suppress upper harmonics, a transistor power amplifier of the switching type connected to said buses to be energized therefrom and having base-emitter circuits connected to said output winding means to be controlled therefrom, and a power output transformer having a primary winding connected with said power amplifier to be energized from said buses under control by the switching action of said power amplifier.

8. A static inverter according to claim 1, comprising a load circuit, a power output transformer having a secondary winding connected to said load circuit and having a primary winding connected to said power-amplifier output circuit, a shorting circuit connected across said latter primary winding and comprising a switching transistor for periodically shorting said power transformer to reduce peak voltages due to reactive load in said output circuit, said switching transistor having an emitter and a collector series connected in said shorting circuit and having a base and a base-to-emitter control circuit, and circuit means connecting said latter control circuit with said secondary winding means and responsive to zero voltage in said secondary winding means, whereby said switching transistor is turned on to short said primary winding of said power output transformer during the off periods of said power amplifier.

9. A static inverter for translating direct current into alternating current, comprising two direct-current supply buses, a square-wave voltage generator connected to said supply buses and having a square-wave output voltage with zero steps intermediate successive positive and negative half-waves, a power amplifier comprising an inverter bridge network of four power transistors for amplifying said stepped square-wave voltage, said bridge network having two power input points connected to said respective buses and having two output points each separated from each of said input points by one of said respective transistors, a power transformer having a secondary load circuit and having a primary winding connected between said two output points, said four power transistors having respective base-to-emitter control circuits connected with said assembly to be impressed by said stepped square-wave voltage, a shorting circuit connected across said primary winding and comprising a switching transistor for periodically shorting said primary winding, said switching transistor having an emitter and a collector series connected in said shorting circuit and having a base and a base-to-emitter control circuit, and circuit means connecting said latter control circuit with said assembly and responsive to the zero value of said stepped square-wave voltage, whereby said switching transistor is controlled to short said primary winding during the step intervals of said voltage for preventing voltage peaks due to reactive loading of said load circuit.

10. In an inverter according to claim 9, said primary winding having a center tap, said emitter and collector of said switching transistor being connected in series with said tap, and two opposingly poled diodes connecting the respective ends of said primary winding in series with said emitter and collector of said switching transistor.

11. In an inverter according to claim 9, said assembly comprising an output transformer having secondary winding means to furnish said stepped square-wave voltage, said circuit means comprising an auxiliary transistor having a base-to-emitter circuit connected to said secondary winding means and being conductive only in response to zero voltage occurring during the step intervals of the stepped square-wave voltage, said auxiliary transistor having an emitter-collector circuit connected to, and energized from, said current supply buses and coupled with said base-to-emitter circuit of said switching transistor to make said switching transistor conductive when said auxiliary transistor is conducting.

12. In an inverter according to claim 11, said secondary winding means comprising two secondary windings, two diodes connected in series with said latter secondary windings respectively and forming together with them a rectifier bridge to provide pulses of the same polarity during positive and negative portions respectively of said stepped square-wave voltage, said control circuit of said auxiliary transistor being connected with said rectifier bridge for controlling said auxiliary transistor in dependence upon said pulses.

13. An inverter according to claim 12, comprising resistance means connected in series with said rectifier bridge across said current supply means, and said base-to-emitter circuit of said auxiliary transistor being connected to a circuit point between said rectifier bridge and said resistance means.

14. In combination, power supply buses, a plurality of transistors having respective collector-emitter circuits connected across said buses in parallel relation to each other, a signal input transformer having a primary signal circuit and having a number of mutually insulated secondaries, each of said parallel transistors having a base-emitter circuit connected to one of said respective secondaries, an output transformer having a secondary output circuit and having a number of mutually insulated and inductively interlinked primaries poled in the same sense and connected to said respective collector-emitter circuits to be energized from said buses under control by said transistors, a shorting circuit connected across one of said primaries, a switching transistor for periodically opening and closing said shorting circuit, said switching transistor having an emitter-collector circuit series connected in said shorting circuit and having a base-to-emitter circuit connected with said signal input transformer for rendering said switching transistor conductive during the off periods of the load-carrying transistor to which said one primary is connected.

15. In combination, power supply buses, a plurality of transistors having respective collector-emitter circuits connected across said buses in parallel relation to each other, a signal input transformer having a primary signal circuit and having a number of mutually insulated secondaries, each of said parallel transistors having a base-emitter circuit connected to one of said respective secondaries, an output transformer having a secondary output circuit and having a number of mutually insulated and inductively interlinked primaries poled in the same sense and connected to said respective collector-emitter circuits to be energized from said buses under control by said transistors, one of said primaries having a mid-tap, a switching transistor having one of its collector and emitter electrodes connected to said mid-tap, two opposingly poled diodes connected between the other electrode of said switching transistor and the respective ends of said primary to form a shorting circuit when said switching transistor is conducting, said switching transistor having a base-to-emitter circuit, and circuit means connecting said latter base-to-emitter circuit with said signal input transformer for rendering said switching transistor conductive during the off periods of the load-carrying transistor to which said mid-tapped primary is connected.

16. A static inverter for translating direct current into alternating current of a given frequency, comprising a semiconductor oscillator, a pair of voltage supply buses, an on-off semiconductor switching network connecting said buses and producing a square wave alternating-current output, a semiconductor coupling circuit connecting the oscillator to said switching network and energizing said network according to the frequency of said oscillator, said coupling circuit including a saturable reactor, said saturable reactor saturating once within each half cycle and discontinuing energization during the saturated portion of said half cycle by said coupling circuit of said switching network, whereby said switching network conducts only during the unsaturated condition of said reactor and the reactor, due to its periods of saturation, suppresses harmonics of the square wave output of said switching circuit.

17. A static inverter for translating direct current into alternating current of a given frequency, comprising a semiconductor oscillator, a pair of voltage supply buses, an on-off semiconductor switching network connecting said buses and producing a square wave alternating-current output, a coupling circuit connecting the oscillator to said switching network and energizing said network according to the frequency of said oscillator, said coupling circuit including a saturable reactor operative in a saturated condition and in an unsaturated condition, said saturable reactor switching from one of said conditions to the other once within each half cycle and effecting energization by said coupling circuit of said switching network only during one of said conditions, whereby said switching network conducts only during one of said conditions and said reactor, due to its switching from one condition to the other, suppresses harmonics of the square wave output of said switching circuit.

18. A static inverter for translating direct current into alternating current of a given frequency, comprising a semiconductor square wave generator including a semiconductor oscillator, a semiconductor third-harmonic suppressor circuit responding to the output of said square wave generator, said suppressor circuit including a saturable reactor operative in a saturated condition and in an unsaturated condition, said saturable reactor having an input connecting to said square wave generator and switching from one condition to the other once during each half cycle, said suppressor circuit having an output circuit inductively interlinked with said reactor and producing a zero potential during one of the conditions of said saturable reactor and reproducing the remainder of the square wave during the other condition of said saturable reactor, whereby the output voltage of said inverter is a stepped square wave.

No references cited.